United States Patent [19]

Tamamori

[11] Patent Number: 5,144,985
[45] Date of Patent: Sep. 8, 1992

[54] VARIABLE LOAD VALVE FOR RAILWAY VEHICLES

[75] Inventor: Hideo Tamamori, Kobe, Japan

[73] Assignee: Nippon Air Brake Co., Ltd., Kobe, Japan

[21] Appl. No.: 764,698

[22] Filed: Sep. 24, 1991

[30] Foreign Application Priority Data

Sep. 26, 1990 [JP] Japan ............................ 2-101249[U]

[51] Int. Cl.⁵ .......................................... F16K 31/126
[52] U.S. Cl. .................. 137/627.5; 303/22.5; 303/22.8
[58] Field of Search ................ 137/85, 116.3, 596.18, 137/627.5; 303/22.5, 22.7, 22.8, 40

[56] References Cited

U.S. PATENT DOCUMENTS

| 3,125,379 | 3/1964 | Valentine | 303/22.8 X |
| 3,413,042 | 11/1968 | Herold | 303/22.8 X |
| 4,077,676 | 3/1978 | Hata | 303/22.5 |
| 4,883,089 | 11/1989 | Tamamori | 137/627.5 X |
| 4,917,148 | 4/1990 | Tamamori | 137/627.5 X |

*Primary Examiner*—Robert G. Nilson
*Attorney, Agent, or Firm*—G. J. Falce

[57] ABSTRACT

A variable load valve device for a railway car having an arrangement for changing the axial position of a variable area piston in order to adjust the output pressure of piston valve assembly in accordance with different load weights of the railway car. The axial position of a supply valve seat is set in accordance with a load weight signal to in turn set the axial position at which the piston assembly, including the variable area piston, assumes a lap condition.

17 Claims, 6 Drawing Sheets

VARIABLE LOAD VALVE FOR RAILWAY VEHICLES

The present invention relates to variable load valve devices and particularly to variable load valve devices used in railway vehicles.

BACKGROUND OF THE INVENTION

The automatic air brake systems of railway cars output a brake command at the car control valve for applying the car brakes in response to a decrease of brake pipe pressure from the brake valve of the head car or locomotive. A variable load valve device by which the brake pressure is adjusted to reflect the car load condition may be included in the automatic brake system. Such a variable load valve used in an automatic brake system is, for example, described in Japanese Patent Publication 43-17529 (Tokkosho). This variable load valve 1 is illustrated in FIG. 6, in which 2 is an air passage from the air spring, and 3 is the weighing mechanism, which converts a change of the air spring pressure into a change in the angle of the adjusting rod 4. The rotation of the adjusting rod 4 moves a roller 8 in the right and left directions in the figure via a lever 6 and a linking piece 7. Also in the figure, 9 is the adjusting unit for the brake cylinder pressure; 10 is the air passage connected to a compressed air source; 11 is an air passage having a command air pressure; 12 is an air passage connected to the brake cylinder; 13 is a back-flow check valve; 14 and 15 are diaphragm pistons; and 16 is a balancing lever. Variable load valve 1 outputs the brake cylinder pressure through air passage 12 in accordance with the load controlled air spring pressure effective in passage 2. This is done in response to the command air pressure received in air passage 11. That is to say that the balancing ratio between the command air pressure exerted on diaphragm piston 14 acting on one side of lever 6 and the brake cylinder pressure exerted on diaphragm piston 15 acting on the other side of lever 6 changes because the weighing mechanism 3 moves the roller 8 in response to the air spring pressure. Other features include the roller 8 moving toward the left direction in the figure when cars are empty, and toward the right direction when they are loaded. For example, when the cars are loaded, roller 8 is moved to the right, the command pressure acting on diaphragm piston 14 balances with the brake cylinder pressure acting on diaphragm piston 15. Therefore, a higher air pressure than that in an empty car condition acts on the diaphragm 15 and the back-flow check valve 13 opens to supply air from passage 10 to brake cylinder passage 12 by way of diaphragm piston 14.

Another example is seen in the Japanese Patent 62-201557 (Tokugansho) which is different from the automatic brake system described above, in that the arrangement changes the characteristic of air pressure supplied to the brake cylinder in response to changes in the air spring pressure. In this connection, the system has combined features of being able to change the effective area of either the balancing piston (which receives the pressure from the brake cylinder and the intermediate body with air supply hole, valve seat, and air supply valve) or the control piston (which receives the pressure from the air spring).

When a command air pressure is provided for the change from an empty car condition to a loaded car condition, a large amount of pressurized air is supplied to passage 12 of the brake cylinder side via the backflow check valve 13 to increase the brake cylinder pressure. Because of this, the brake force will be obtained corresponding to the increase in the car weight. The amount of lift of the back-flow check valve, at that time, becomes relatively small in response to the movement of the command piston 14, due to the rightward movement of roller 8 changing the effective ratio of balance lever 16 when the weighing mechanism 3 detects a heavy load condition. This requires a relatively longer time to increase the brake cylinder pressure than during light load conditions and, therefore, has the problem of being inappropriate for operating brakes. In addition, another problem arises in that the component parts wear very quickly and tend to have a short life because the structure using the balancing lever 16 supports the control diaphragm piston 14 and the balance diaphragm piston 15, therefore, producing a tremendous force upon the point where the command force is applied, the point where the balance force is used, and at the fulcrum point.

SUMMARY OF THE INVENTION

The object of this invention is to provide a variable load valve having an output pressure that reflects the car weight in response to the command air pressure and the car weight change by accordingly varying the effective areas of the aforementioned conventional intermediate body, the balancing piston, or the control piston in order to solve the problem of the extended brake response and short service life.

Briefly, the current invention achieves this object by providing a variable load valve having an air supply chamber connected to an air pressure source; an output chamber connected to an output passage; an exhaust chamber open to the atmosphere; a valve seat installed in the air supply opening between the aforementioned air supply chamber and the output chamber; an air supply valve seated in the valve seat by the force of a spring; an exhaust valve rod (having an exhaust passage whose one end opens to the atmosphere and the other end opens into the aforementioned exhaust chamber) with the front end facing against the air supply valve and passing through the air supply opening; a control piston which generates a command force to move the aforementioned exhaust valve toward the direction of the air supply valve; a control diaphragm whose outer edge is fixed inside the valve body and inner edge fixed to the control piston body; a balancing piston which generates the balancing force to counteract the aforementioned command force, by receiving air pressure from the output chamber; a balancing diaphragm whose outer edge is fixed inside the valve body and inner edge fixed to the balancing piston body; an intermediate body that is capable of moving in the direction of the aforementioned exhaust valve rod having the air supply chamber, air supply hole, valve seat, and the air supply valve; a weighing unit which has a variable load advancing/retracting unit that responds to the load change and moves the aforementioned intermediate body; and means to change the effective area ratio of both pistons in which a first plane and a second plane cross each other, the first plane being formed by the surface of a first fin radiating from the piston body adjacent the diaphragm thereof and the second plane formed by the surface of a second fin radiating from the variable load valve body adjacent the diaphragm of the second fin located in between the spaces of the first fin.

Other objects and advantages of the present invention will become apparent from the following more detailed explanation when taken in conjunction with the accompanying drawings in which.

DESCRIPTION AND OPERATION

Figure 1:
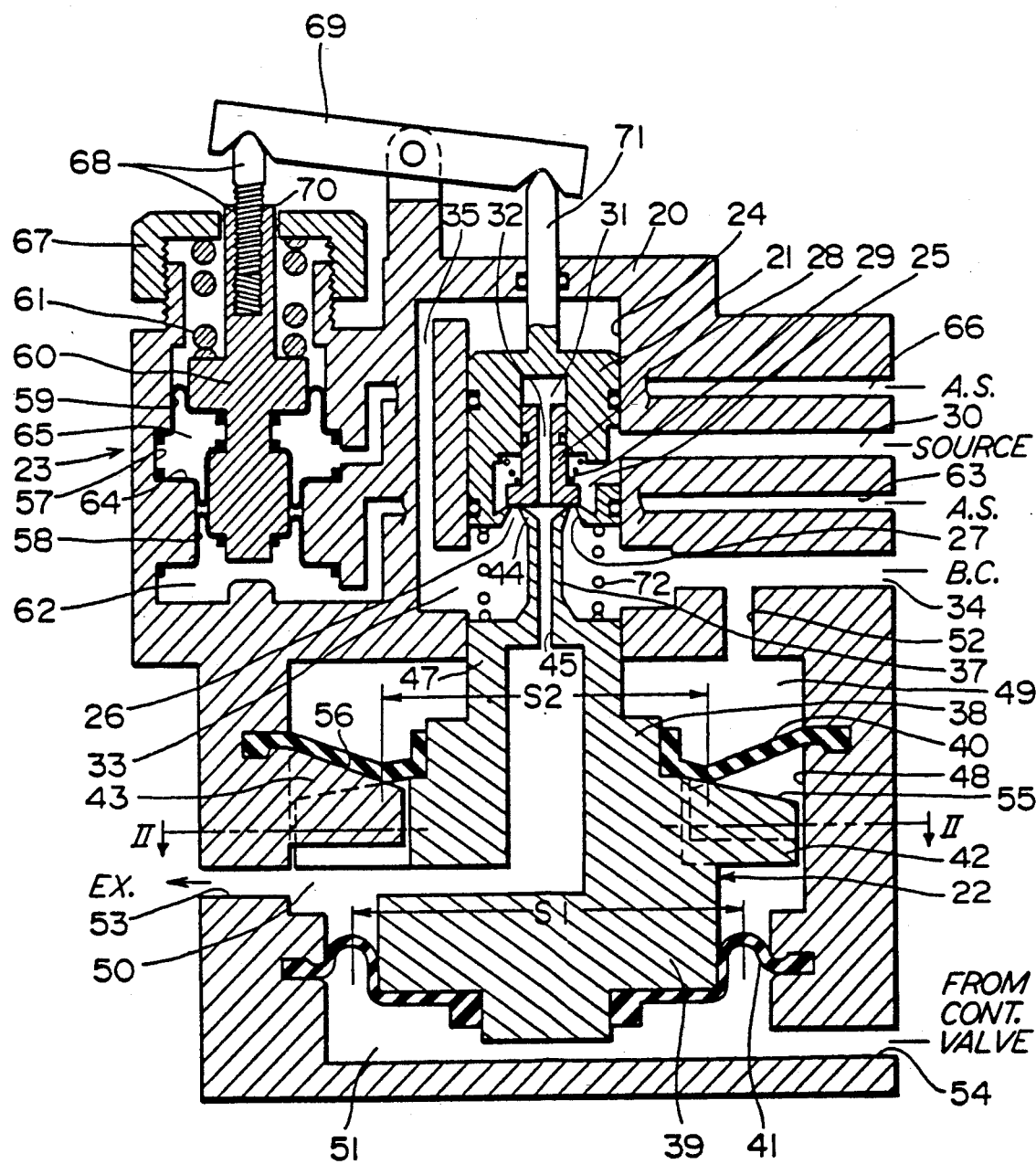
FIG. 1 is a sectional assembly view of a first embodiment of the invention.
Figure 2:
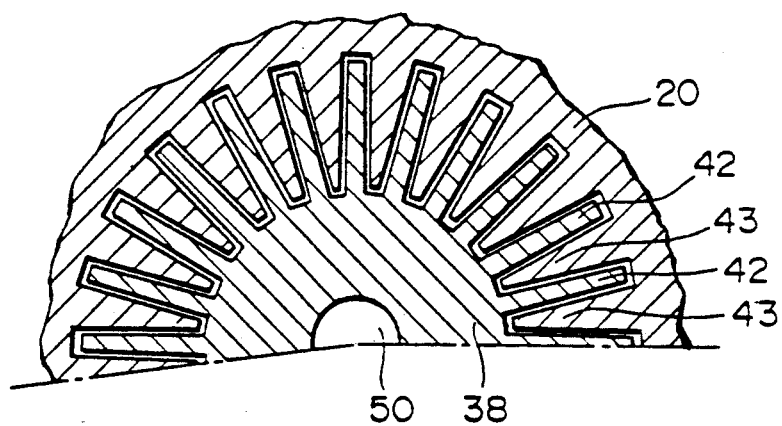
FIG. 2 is a fragmentary sectional view taken along the cutting plane 2—2 in FIG. 1.

A first embodiment of the present invention is now explained referring to FIGS. 1 and 2. The variable load valve shown in FIG. 1 includes an intermediate body 21 and a piston unit 22 that is operatively arranged in the valve body 20 to which a weighing unit 23 has been added.

The intermediate body 21 has the shape of a short cylinder, and is inserted into an inner bore 24 which is formed in the upper part of body 20 to be freely movable in both an upward and a downward direction. Within that intermediate body 21 is formed an air supply chamber 25 into which an air supply opening 26 is made, so that the air supply chamber opens downwardly. A supply valve seat 27 is installed on the air supply chamber side of the air supply opening 26, as well as an air supply valve 28, the air supply valve 28 being urged by a valve spring 29, so as to engage the valve seat 27. The air supply chamber 25 is always connected to the air pressure source via a passage 30 in the valve body 20. A passage 32 is formed in the air supply valve 28 and connects a rear chamber 31 located in the upper part of the air supply valve and the air supply opening 26 located in the lower part of the air supply chamber.

The lower part of the intermediate body 21 is formed with the supply valve seat 27, while the space below the intermediate body 21 is an output chamber 33 connected to brake cylinder device via a passage 34. In the figure, 35 is a passage connecting the space above the output chamber 33 and the intermediate body 21 (i.e., the part of the inner bore 24).

A piston unit 22 is installed in a further bore 48 made in the lower part of the valve body 20 in FIG. 1, and consists of a balancing piston body 38, that is, connected to the lower end of an exhaust valve stem 37, a control piston body 39, a diaphragm 40 of the balancing piston, a diaphragm 41 of the control piston, a first plurality of fins 42, and a second plurality of fins 43.

The exhaust valve rod 37 has its front end 44 adjacent the air supply valve 28 from the output chamber side 33, and the outer diameter of that front end 44 is made the same as the inner diameter of the rear chamber of the air supply valve 28. The exhaust valve also has an exhaust passage 45 inside, and one end of the exhaust passage 45 opens toward the front end and the other end opens toward the exhaust chamber 50 through the inside of the piston body 38.

Being formed as an integral unit, the lower part 47 of this exhaust valve rod 37, the balancing piston body 38 and the control piston body 39 move in upward and downward directions, as viewed in the figure, together with the exhaust valve rod 37. The lower part 47 of the exhaust valve rod 37 projects into the lower part of the inner bore 24 of the valve body 20. The inner periphery of diaphragm 40 is affixed to the outer perimeter of the balancing piston body 38. In addition, the central opening of diaphragm 41 is connected to the lower center of the control piston body 39, and the outer periphery of diaphragms 40 and 41 is fixed to the wall of the valve body 20. The diaphragms 40 and 41 are made of rubber material, and the air-tight areas formed by these diaphragms within bore 48 provide a balancing chamber 49, an exhaust chamber 50, and a command air chamber 51. The balancing chamber 49 is connected to the output chamber 33 via a passage 52. The exhaust chamber 50 opens to atmosphere via the wall of valve body 20 via an exhaust passage 53. The command air chamber 51 receives a command air pressure via a command air passage 54 and is formed in the wall of valve body 20. The multiple blades comprising the first plurality of fins 42 project radially outwardly from the body of piston unit 22 intermediate diaphragms 40 and 41, as shown in FIGS. 1 and 2. Each outward end approaches the inner surface of the bore 48, and a surface 55 adjacent diaphragm 40 forms a downward slope from body 20 toward piston unit 22. The multiple blades comprising the second plurality of fins 43 project radially from the wall of the bore 48 in the valve body 20, and are disposed within the spaces between the blades of the first fins 42 with a surface 56 adjacent diaphragm 40 having a downward slope or taper opposite that of the corresponding surface of the first plurality of fins. The plane of surface 55 of the first plurality of fins 42 and the plane of surface 56 of the second plurality of fins 43 forming an annular intersection between the balancing piston body 38 and the wall of the bore 48. The circle diameter S2 of this annular intersection changes by movement of the balancing piston body 38 in an axial direction to accordingly change the effective pressure area of balancing piston 38 subject to balancing chamber pressure.

The weighing unit 23 is installed in the upper left part of the valve body 20 in FIG. 1, and includes a variable load piston 60 and a spring 61, with diaphragms 58 and 59 connected between piston 60 and a bore 57 formed in the valve body 20. The space below diaphragm 58 within bore 57 constitutes an air pressure chamber 62, and this air pressure chamber 62 is connected by an air passage 63 to one of the air springs of a car on which the variable load valve is installed.

Another diaphragm 64 is installed between diaphragm 58 and 59 with the same effective pressure area as diaphragm 58, the space between this diaphragm 64 and diaphragm 59 forming another air pressure chamber 65. This air pressure chamber 65 is connected to a different air spring (through a passage 66) than the air spring to which passage 63 is connected, as described above. The air pressures of air pressure chambers 62 and 65 acting on diaphragms 58 and 59 urge variable load valve 60 in an upward direction. The effective area of diaphragm 58 is one half of the effective area of diaphragm 59 so that the air pressure effective in chambers 62 and 65 are averaged and this averaged pressure is exerted on the variable load valve 60. Spring 61 is installed to resist upward motion of the variable load piston 60. Spring 61 is located between the piston 60 and a nut 67 that is threaded to the valve body 20, so that the force exerted by spring 61 can be adjusted by nut 67. This adjustment is made so that the axial displacement of a rod 68 changes within a range of air spring pressures corresponding to an empty car condition and a loaded car condition. The rod 68 extends from the upper part of the variable load valve in the figure and projects through nut 67 so that its upper end attaches to the one end of a transfer lever 69 that is pivotally connected to body 20 at a location intermediate its ends. A length control unit 70 is installed in the middle of rod 68. Rod 68 is the variable load moving unit, and the position of the variable load piston 60 changes in response to a change in the car body load condition, where the upward force due to the pressure exerted by the aforementioned air spring and the counteracting force of the spring 61 balance each other. Therefore, the rod 68 moves up and down in response to changes in the car body load condition. The motion of this rod is transmitted to the intermediate body 21 through the lever 69. Because of this, a shaft 71 that projects from the upper end of the intermediate body is connected to lever 69 through the wall of valve body 20. In the figure, 70 is a fulcrum of lever 69 installed in the valve body 20. By changing the position of this fulcrum, the ratio of the output air pressure and the air spring pressure is changed. The displacement of rod 68 is transmitted to the projecting end of shaft 71 in accordance with the ratio of lever 69, and moves the intermediate body 21. In the figure, 72 is a return spring, and is installed between the intermediate body 21 and the balancing piston body 38 in such a way that the return spring is compressed.

The variable load valve in such an arrangement has a relationship between input and output air pressures as described below. If the effective area of the control piston, which is comprised of the control piston body 39 and its diaphragm 41, is defined as $S_1$, and the effective area of the balancing piston, which is comprised of the balancing piston body 38 and its diaphragm 40, is defined as $S_2$, the output air pressure $P_2$, of the output chamber 33 required to establish a lap condition, when the command air pressure $P_1$ acts on the command air chamber 51, as illustrated in the figure, is expressed by the following equation:

$$P_2 = (S_1/S_2) \times P_1 \tag{1}$$

where the effective area of the balancing piston $S_2$ is the area which is formed when the cross-section area of the upper end 44 of the exhaust valve rod 37 is subtracted from the area formed within the aforementioned intersection between the planes of the respective first and second fins. That is to say that the diaphragm 40 of the balancing piston engages the first fin 42 between the annular point from which the first fin projects from the balancing piston body 38 and the aforementioned intersection, and transmits the pressure of the balancing chamber 49 air to the balancing piston body 38 within this area of diaphragm engagement; while outside of this area, the diaphragm 40 of the balancing piston is attached to the second fin 43 protruding from the valve body 20, and thus the force generated by the pressure of the balancing chamber 49 air is transferred to the valve body 20 and does not act on the balancing piston body 38.

The variable load valve output changes by the displacement of the intermediate body 21, which is accomplished by movement of the variable load moving part (protruding shaft 71) of the weighing unit 23. That is to say that the position change of the intermediate body 21 moves the intermediate body downward through the action of lever 69 and protruding shaft 71. This is accomplished in the following manner. When the car body weight increases due to the increase of the load, the variable load piston 60 moves up against the spring 61 in the figure, causing downward movement of the intermediate body. Furthermore, if the car body weight decreases due to the decrease of the load, the intermediate body 21 moves upward opposite to what was described above. In the case of the intermediate body 21 being moved downward, in order to reach a lap condition at that displaced position of the intermediate body 21, the upper end of the exhaust valve rod 37 moves down a corresponding amount, so the balancing piston body 38 and the control piston body 39 which are assembled together with the exhaust valve rod 37 also move down. A lap condition exists when both the supply valve seat 27 and the exhaust valve seat 44 are engaged with valve member 28 to terminate the supply and exhaust of brake cylinder pressure when a force balance occurs across piston unit 22. In the lap condition corresponding to such displacement of the intermediate body 21, the diameter of the intersecting line in relation to the aforementioned effective area $S_2$ of the balancing piston decreases more than before, and becomes the effective area $S_2'$ which is smaller than the effective area $S_2$. Furthermore, if the intermediate body 21 is displaced upwardly, the effective area becomes $S_2''$ which is larger than the effective area $S_2$ unlike the previous case.

The change of the effective area $S_2$ due to the change in the car body weight affects the output air pressure $P_2$ according to the equation (1) written above. That is to say that, if the effective area $S_2$ is decreased to be $S_2'$ due to the increase of the car body weight when the command air pressure $P_1$ is kept at a certain fixed value, the output air pressure $P_2$ is going to increase. On the other hand, if the effective area $S_2$ is increased to be $S_2''$ due to the decrease of the car body weight, the output air pressure $P_2$ is going to decrease.

Therefore, it is possible to vary the output air pressure depending upon the car body weight so that constant brake operation can be achieved even with the varying weight of the car body. That is to say that the command air pressure $P_1$ is made to be varied depending on the necessary strength of the brake operation, and the car operator can always have a constant brake operation by this command air pressure even with the change in the car body weight.

An alternate embodiment is explained with reference to FIG. 3. The load valve in this example is arranged so as to omit the lever 69 and the shaft 71 that are located between the rod member 68 and the intermediate body 21 in the first embodiment. The intermediate body 21 is moved directly by the rod member 68 in this alternate embodiment. Because of this, the weighing unit 23a has been placed upside down from the first embodiment and is situated in the upper part of the intermediate body 21, as shown in FIG. 3.

The weighing unit 23a includes a separate rotatable cylinder 76 that is installed within a bore 75 in the valve body 20a. Within that cylinder 76, the diaphragms 58 and 59, the variable load piston 60 and the spring 61 are installed just like in the first embodiment, and the air pressure chambers 62 and 65, and the passages 63 and 66 are accordingly made. The nut 77 is placed at the lower end of the cylinder 76, and is prevented from rotating by a pin 78 that projects into a vertical slot of the nut so that the nut can freely move in a vertical direction. A rotation control means in the form of a stem 79 that projects from cylinder 76 to the outside of the valve body 20a is formed at its projecting end to receive a tool to effect rotation of cylinder 76. An adjusting bolt 80 is screw-threaded into the valve body 20a and engages the upper end of cylinder 76. The rod 68, which does not have a length controller, penetrates through the wall of the valve body 20a, and directly engages the intermediate body 21.

The rotation control means 79 changes the amount of compression of the spring 61, and corresponds to the nut 67 in the first embodiment. The bolt 80 corresponds to the length controller 70 in the first embodiment.

Figure 3:
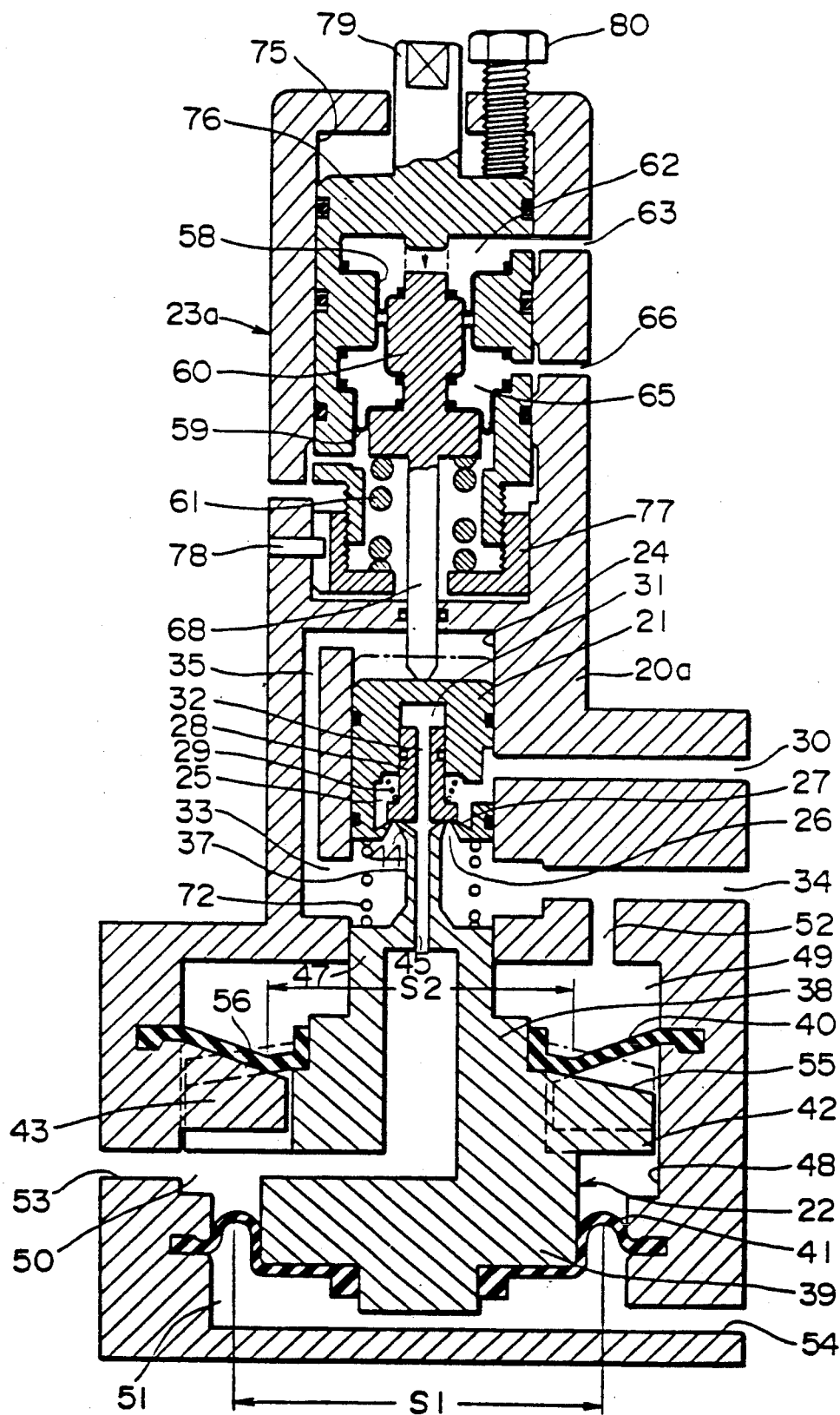
FIG. 3 is a sectional assembly view of an alternate embodiment of the invention.

The rest of the components are the same as in the first embodiment and the explanation is omitted, the same reference numerals being used in FIG. 3 for like components in FIG. 1.

Figure 4:
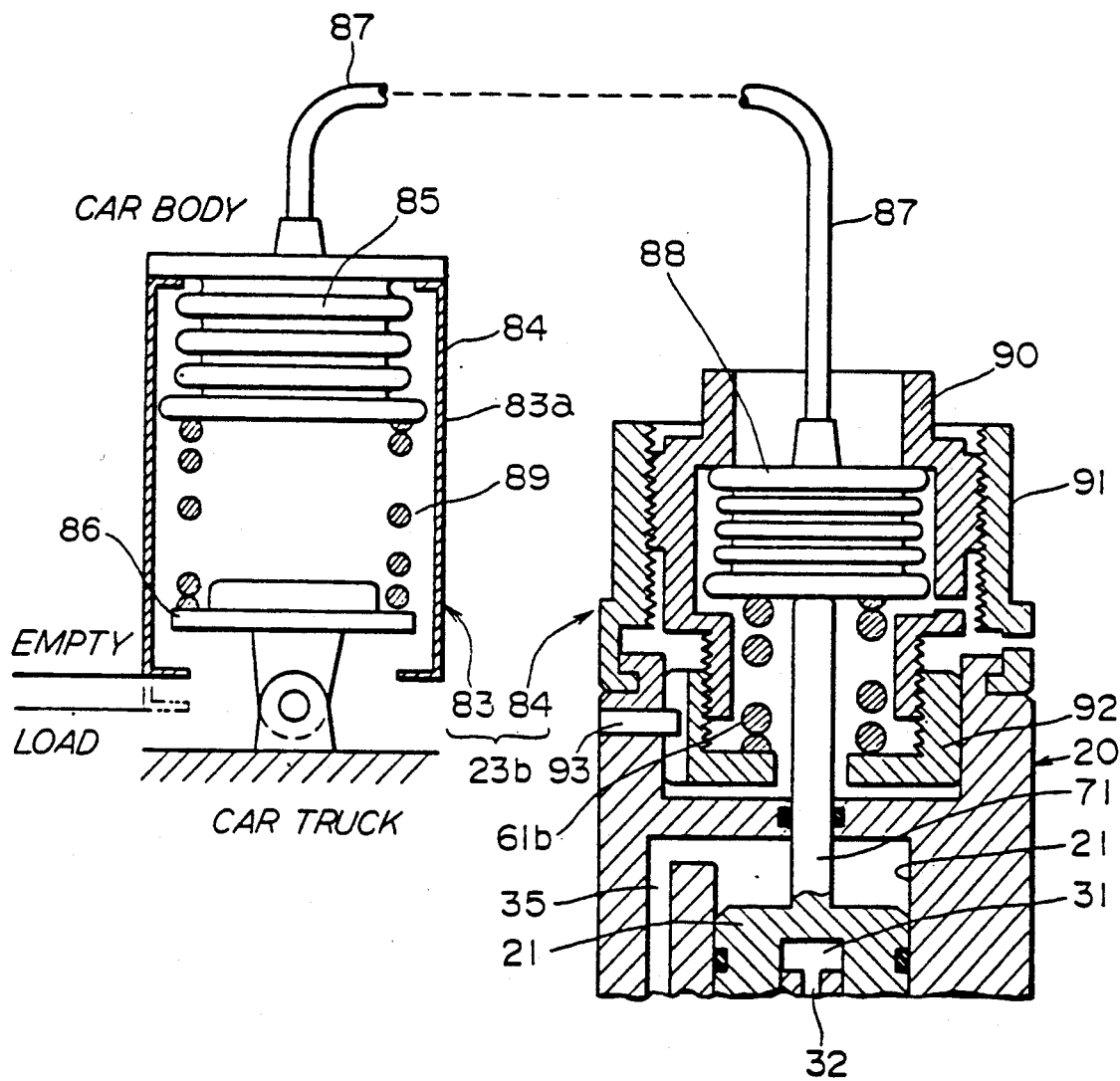
FIG. 4 is a sectional assembly of another embodiment of the invention for application on railway cars with mechanical springs.

A third embodiment of the invention is explained with reference to FIG. 4. The variable load valve in this embodiment is suitable for cars in which metal springs are used between car bodies and car trucks and differs from the first embodiment in that the weighing unit 23 has been replaced by a different weighing unit 23b, while the remainder is identical to the arrangement of FIG. 1, so that only the weighing unit 23b is explained here.

The weighing unit 23b is comprised of a weighing device 83 and a variable load advancing/retracting unit 84. The weighing device is carried in a cylindrically shaped case 83a, which is fixed to the car body, and includes a bellows 85 that is fixed to the upper end of the case 84 and contains hydraulic fluid, a weighing spring 89 between the lower end of the bellows 85 and a spring holder 86 that is located in the lower part of the case 84 and is supported by the car truck, and a hydraulic line 87, one end of which is connected to the inside of the bellows 85. The pressure of the hydraulic fluid inside the bellows 85 increases with the increase of the car body weight, which compresses the bellows in a downward direction against the compression of the spring 89.

The variable load advancing/retracting unit 84 comprises a bellows 88 that is supplied with hydraulic fluid from the bellows 85 via hydraulic line 87 in order to either expand or contract the bellows 88, a holder case 90 that supports the bellows 88 directly at the upper end and indirectly at the lower end through the spring 61b, and an attaching unit 91 which attaches the holder case 90 to the valve body 20 in such a way that the lower end of the bellows 88 touches the upper end of the shaft 71 that protrudes from the intermediate body 21. The part of the holding case 90 that supports the lower end of the spring 61b is closed by the nut 92, which is installed in a concavity formed in the valve body 20. Nut 92 is prevented from turning by a pin 93 that rides in a vertical slot in the nut. The attaching unit 91 is threaded onto the outer perimeter of the holding case 90, and is connected to the valve body 20 with ability to rotate. This arrangement enables the bellows 88 to expand against the spring 61b in response to hydraulic pressure transmitted to the bellows 88 according to the weight of the car body, and thus the lower end of the bellows 88 advances or retracts in response to the car body weight. In this manner, the position of the intermediate body 21 is regulated in response to the car body weight. If one rotates the holding case 90 and the attaching unit 91 together, the connecting position between the nut 92 and the holding case 90 will change, which enables the degree of compression of the spring 61b to be changed. By rotating only the attaching unit 91, the position relationship between the intermediate body 21 and the variable load advancing/retracting unit 84 may be adjusted to either advance or retract holding case 90.

In each embodiment described above, the first and second fins 42 and 43 are only shown with their faces 55 and 56 adjacent diaphragm 40 both sloped at an angle to the axis of piston unit 22. However, an arrangement is also feasible in which only one of the first and second fins are formed with a sloped face adjacent diaphragm 40.

Figure 5:
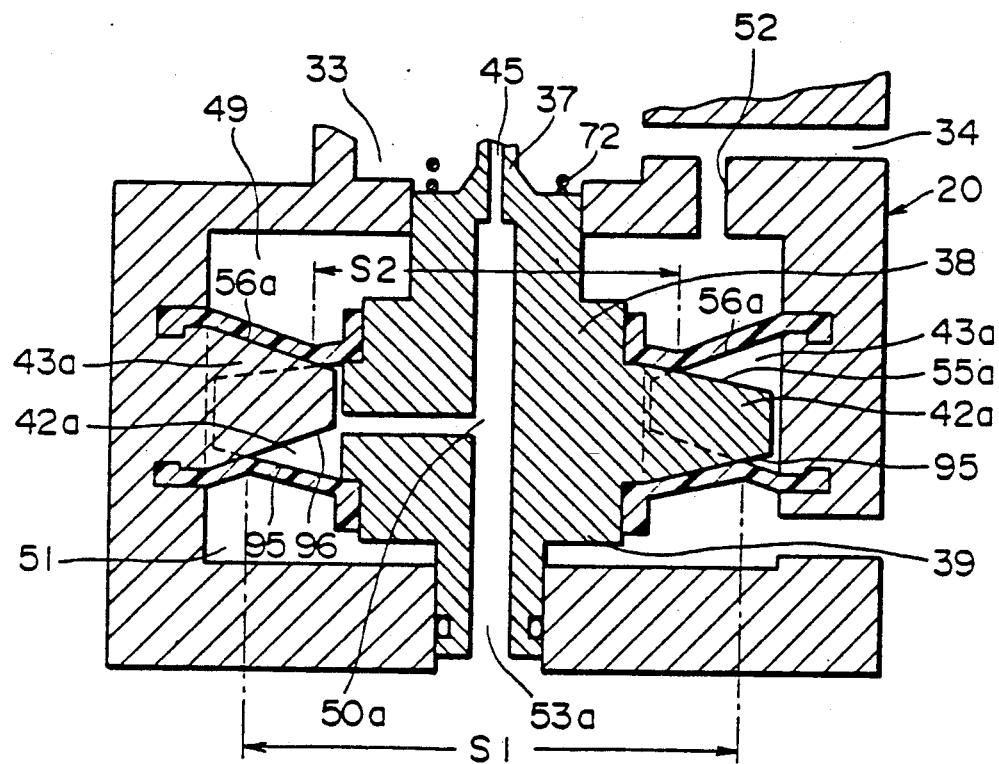
FIG. 5 is a partial sectional assembly view showing an alternate arrangement of the variable ratio diaphragm piston assembly in the variable load valves of FIGS. 1, 3, and 4.
Figure 6:
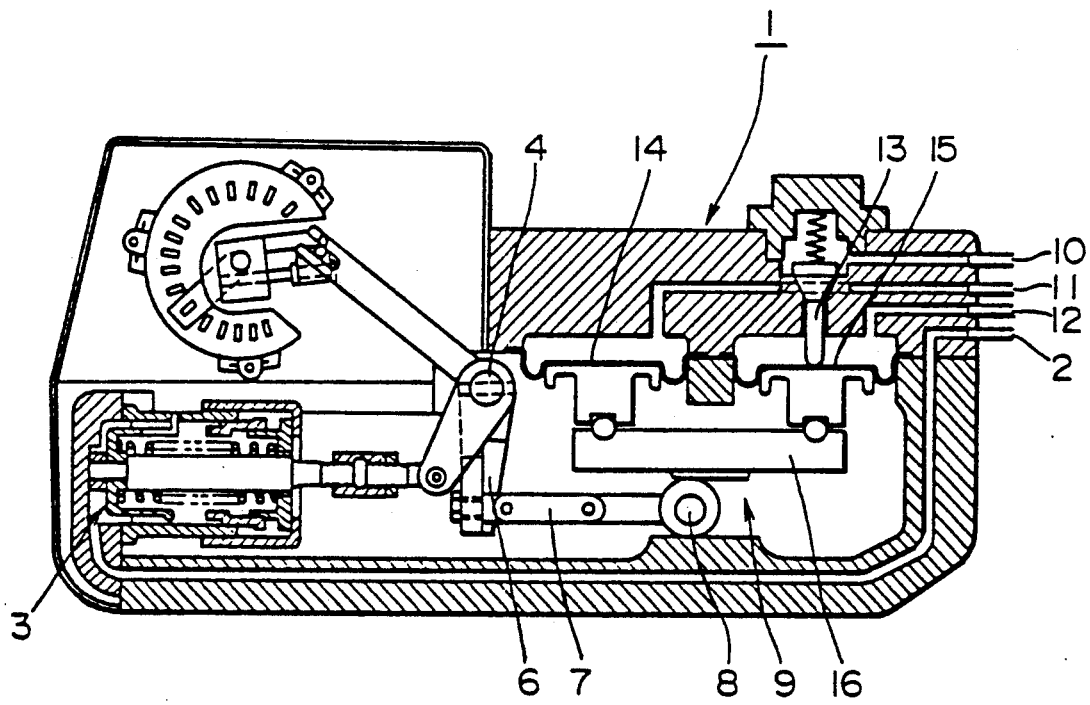
FIG. 6 is a sectional assembly view of an existing variable load valve device over which the present invention is an improvement.

Furthermore, in each of the foregoing embodiments, the arrangement described the first fins as being formed on the balancing piston body 38 and the second fins as being formed on valve body 20. In place of this arrangement, the fins corresponding to the first fins 42 and the second fins 43 may be formed on the control piston body 39 side and the corresponding valve body 20 radially adjacent thereto. Even in such an arrangement, the effective area ratio between the balancing piston and the control piston can be changed. Furthermore, as shown in FIG. 5, it is also possible to arrange the first and second fins to lie between the balancing piston body 38 and the control piston body 39, so that the upper fin surfaces 55a, 56a lie adjacent diaphragm of balancing piston body 39 and bottom fin surfaces 95, 96 lie adjacent the control piston body 39. This will change the effective area ratio because of the change in the effective areas of both the balancing piston and the control piston. In such an arrangement, it is necessary to extend the exhaust passage 53a through valve body 20 from the exhaust chamber 50a to atmosphere via the control piston body 39. Also in this arrangement of FIG. 5, an arrangement is feasible in which only a single one of the faces 55a, 56a and faces 95, 96 are tapered or sloped and the other face is horizontal to the axis of piston unit 22.

I claim:

1. A variable load valve device for a railway vehicle comprising:
   (a) a supply passage to which a source of fluid under pressure is connected;
   (b) an output passage to which a fluid pressure operated brake cylinder device of the vehicle is connected;
   (c) an exhaust passage connected to atmosphere;
   (d) a valve assembly including:
      (i) a valve member;
      (ii) a supply valve seat between said supply passage and said output passage with which said valve member coacts to control the supply of fluid under pressure to said brake cylinder device;
      (iii) an exhaust valve seat between said output passage and said exhaust passage with which said valve member coacts to control the exhaust of fluid under pressure from said brake cylinder device; and
      (iv) means for urging said valve member toward engagement with said supply valve seat;
   (e) a balancing chamber to which said output passage is connected;
   (f) a piston member including:

(i) said exhaust valve seat;
(ii) a balancing piston having a first pressure area subject to said balancing chamber fluid under pressure to urge said piston member in a first axial direction to effect disengagement of said exhaust valve seat from said valve member; and
(iii) a control piston having a second pressure area subject to a command fluid pressure to urge said piston member in a direction opposite said first axial direction to effect engagement of said exhaust valve seat with said valve member and to effect disengagement of said valve member from said supply valve seat, said valve assembly having a lap condition in which said valve member is engaged with said supply valve seat and said exhaust valve seat when a force balance exists across said piston member;
(j) means for varying said first pressure area of said piston member in accordance with the axial position of said piston member in said lap condition of said valve assembly;
(k) an intermediate member including said supply valve seat, said intermediate member being axially movable to accordingly change the axial position of said piston member in said lap condition of said valve assembly; and
(l) advancing/retracting means for automatically effecting said axial movement of said intermediate member in response to different load conditions of said vehicle.

2. A variable load valve device, as recited in claim 1, wherein said balancing piston and said control piston have a common body.

3. A variable load valve device, as recited in claim 2, wherein said means for varying said first pressure area of said piston member comprises:
(a) a first diaphragm member having an inner periphery fixed to said common body and an outer periphery fixed to the body of said variable load valve device;
(b) a first plurality of fins projecting radially from said common body and having a first support surface with which said first diaphragm member is removably engaged; and
(c) a second plurality of fins projecting radially from the body of said variable load valve device, said first and second plurality of fins being disposed within the interstices of the other of said first and second fins, said second plurality of fins having a second support surface with which said first diaphragm member is removably engaged, said first and second support surfaces being tapered in opposite directions from each other such that said first pressure area varies as the axial position of said piston member changes.

4. A variable load valve device, as recited in claim 3, wherein said second pressure area is constant.

5. A variable load valve device, as recited in claim 3, wherein said exhaust valve seat is formed integral with said common body on the side thereof corresponding to said first pressure area.

6. A variable load valve device, as recited in claim 5, wherein said intermediate member is formed with a cavity in which said valve member is carried and said means for urging said valve member into engagement with said supply valve seat comprises a spring in said cavity between the body of said intermediate member and said valve member.

7. A variable load valve device, as recited in claim 6, further characterized in that said exhaust valve seat is engageable with said valve member on the same side as said supply valve seat.

8. A variable load valve device, as recited in claim 1, wherein said advancing/retracting means comprises:
(a) a load sensing piston;
(b) a passage means for connecting a variable control pressure to one side of said load sensing piston in accordance with the load weight of said vehicle;
(c) a transfer lever pivotally connected at a point intermediate its ends to the body of said variable load valve device, one end of said transfer lever being connected to said load sensing piston at the side thereof opposite said one side and the other end connected to said intermediate body.

9. A variable load valve device, as recited in claim 8, wherein said advancing/retracting means further comprises a threaded adjusting rod between said one end of said transfer lever and said opposite side of said load sensing piston.

10. A variable load valve device, as recited in claim 8, wherein said advancing/retracting means further comprises:
(a) an adjustable nut threadedly connected to the body of said variable load valve device; and
(b) a compression spring between said opposite side of said load sensing piston and said adjustable nut.

11. A variable load valve device, as recited in claim 1, wherein said advancing/retracting means comprises:
(a) a load sensing piston engageable at one side thereof with said intermediate member; and
(b) a passage means for connecting a control pressure to the side of said load sensing piston opposite said one side, said control pressure varying in accordance with the vehicle load weight.

12. A variable load valve device, as recited in claim 11, wherein said advancing/retracting means further comprises:
(a) a rotatable cylinder in the body of said variable load valve device and having:
(i) a bore; and
(ii) a threaded projection;
(b) said load sensing valve disposed in said bore for axial movement therein;
(c) a spring seat having screw-threaded engagement with said threaded projection;
(d) means for preventing rotation of said spring seat;
(e) a compression spring between said spring seat and said one side of said load sensing piston; and
(f) means for effecting rotation of said cylindrical member.

13. A variable load valve device as recited in claim 11, wherein said advancing/retracting means further comprises:
(a) an axially displaceable cylinder in the body of said variable load valve device and having a blind bore in which said load sensing piston is disposed for engagement with said intermediate member at said one side thereof and for engagement with the end of said bore at said opposite side; and
(b) an adjusting screw between the body of said variable load valve device and said cylinder at one end thereof to effect axial displacement of said cylinder and thereby said load sensing piston.

14. A variable load valve device, as recited in claim 1, wherein said advancing/retracting means comprises:

(a) a cylinder member in the body of said variable load valve device;
(b) a cavity in said cylinder;
(c) a bellows disposed in said cavity with one end abutting the bottom of said cavity and the opposite end engageable with said intermediate member; and
(d) means for transmitting hydraulic fluid to said bellows in accordance with the vehicle load weight.

15. A variable load valve device, as recited in claim 3, further comprising means for varying said first pressure area of said piston member.

16. A variable load valve device, as recited in claim 15, wherein said means for varying said first pressure area of said piston member comprises:
(a) a second diaphragm member axially spaced from said first diaphragm member and having an inner periphery fixed to said common body and an outer periphery fixed to the body of said variable load valve device;
(b) said first plurality of fins lying within the space between said first and second diaphragm members and having a third support surface with which said second diaphragm member is removably engaged;
(c) said second plurality of fins having a fourth support surface with which said second diaphragm member is removably engaged, said third and fourth support surfaces being tapered in opposite directions from each other such that said second pressure area varies as the axial position of said piston member changes.

17. A variable load valve device, as recited in claim 16, further characterized in that said first and third support surfaces are tapered in opposite directions from each other and said second and fourth support surfaces are tapered in opposite directions from each other.

* * * * *